(12) United States Patent
Kono

(10) Patent No.: US 10,030,547 B2
(45) Date of Patent: Jul. 24, 2018

(54) OVERHEAD CAMSHAFT ENGINE

(71) Applicant: HONDA MOTOR CO., LTD., Tokyo (JP)

(72) Inventor: Shohei Kono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 15/364,901

(22) Filed: Nov. 30, 2016

(65) Prior Publication Data

US 2017/0260881 A1    Sep. 14, 2017

(30) Foreign Application Priority Data

Mar. 9, 2016    (JP) ................... 2016-045618

(51) Int. Cl.
| | |
|---|---|
| *F01L 1/02* | (2006.01) |
| *F01L 1/053* | (2006.01) |
| *F01P 1/02* | (2006.01) |
| *F02B 75/16* | (2006.01) |
| *F02F 1/00* | (2006.01) |
| *F16H 57/035* | (2012.01) |
| *F02F 7/00* | (2006.01) |
| *F01L 1/047* | (2006.01) |
| *F16C 3/06* | (2006.01) |
| *F16C 9/02* | (2006.01) |

(52) U.S. Cl.
CPC ............ *F01L 1/053* (2013.01); *F01L 1/024* (2013.01); *F01P 1/02* (2013.01); *F02B 75/16* (2013.01); *F02F 1/002* (2013.01); *F02F 7/0053* (2013.01); *F16H 57/035* (2013.01); *F01L 2001/0476* (2013.01); *F16C 3/06* (2013.01); *F16C 9/02* (2013.01); *F16C 2240/70* (2013.01); *F16C 2360/22* (2013.01)

(58) Field of Classification Search
CPC ..... F01L 1/24; F01L 1/053; F01L 2001/0476; F02F 1/002; F02F 7/0053; F01P 1/02; F02B 75/16; F16H 57/035; F16C 2360/22; F16C 9/02; F16C 3/06; F16C 2240/70

See application file for complete search history.

(56) References Cited

U.S. PATENT DOCUMENTS 6,484,679 B2 * 11/2002 Ito ...................... F01L 1/02
                                              123/193.5

FOREIGN PATENT DOCUMENTS

| EP | 1201882 A1 | 5/2002 |
|---|---|---|
| EP | 1288454 A1 | 3/2003 |
| JP | 2002349340 A | 12/2002 |

OTHER PUBLICATIONS

Extended European Search Report for Application No. 16207091.6, dated Jun. 27, 2017, 8 pages.

* cited by examiner

*Primary Examiner* — Zelalem Eshete
(74) *Attorney, Agent, or Firm* — Armstrong Teasdale LLP

(57) ABSTRACT

In an overhead cam engine (10) having a first bearing (21) supported by the cylinder block (11), and a second bearing (22) supported by a bearing retaining member (60) attached to the cylinder block inside a crankcase chamber (12) for rotatably supporting a crankshaft (20), the crankshaft is provided with a reduced diameter portion (24b) having a smaller outer diameter than an adjoining part of the crankshaft on a side of the second bearing facing away from a cylinder (15) defined in the cylinder block, and a crankshaft pulley (53) is mounted on the reduced diameter portion.

10 Claims, 7 Drawing Sheets

OVERHEAD CAMSHAFT ENGINE

TECHNICAL FIELD

The present invention relates to an improved overhead camshaft engine.

BACKGROUND ART

There is a desire to form an engine main body defining a cylinder and a crankcase chamber by using as small a number of component parts as possible, and support the crankshaft of the engine in a favorable manner in terms of structural integrity and ease of assembly. In a known overhead camshaft engine disclosed in JP2002-349340A, the engine main body includes a cylinder block that is integrally formed with a cylinder head, and a first bearing for supporting a first end of the crankshaft is fitted into a hole formed in the cylinder block. The lower end of the cylinder block is defined by a plane extending obliquely across the crankshaft, and a crankcase having a corresponding upper end is attached to the lower end of the cylinder block to define the crankcase chamber in cooperation with the cylinder block. The crankcase is formed with a hole, and a second bearing for supporting a second end of the crankshaft is fitted into the hole formed in the crankcase.

In this engine, the camshaft is provided in an upper part of the engine, and is actuated by the crankshaft via a timing belt which is passed around a crankshaft pulley fitted on the crankshaft and a camshaft pulley fitted on the camshaft. In the case of a four stroke engine, the camshaft pulley is required to be twice as large as the crankshaft pulley in diameter. The crankshaft pulley is positioned on a part of the crankshaft located between the second bearing and the adjoining crank web or between the second bearing and the cylinder of the engine.

This part is a load bearing part of the engine (the bending loading transmitted from the piston of the engine), and is required to have a relatively large diameter, typically a same diameter as the part of the crankshaft supported by the second bearing. Therefore, the effective diameter of the crankshaft pulley which is given as the sum of the diameter of the crankshaft and twice the thickness of the hub of the crankshaft pulley is significant. The effective diameter of the camshaft pulley is required to be twice as large as the effective diameter of the crankshaft, and the valve actuating chamber of the engine is required to be large enough to accommodate the camshaft pulley.

As a result, the mass of the crankshaft pulley and the camshaft pulley is undesirably great, and the overall height of the engine is undesirably great. Also, the assembling of the engine is undesirably complex.

BRIEF SUMMARY OF THE INVENTION

In view of such problems of the prior art, a primary object of the present invention is to provide an overhead camshaft engine which can be constructed as a compact unit.

A second object of the present invention is to provide an overhead camshaft engine which is easy to assemble.

A third object of the present invention is to minimize the mass of the moving parts in an overhead camshaft engine.

To achieve at least a part of such objects, the present invention provides an overhead camshaft engine (10), comprising: a first bearing (21) and a second bearing (22) provided on an engine main body (11); a crankshaft (20) having a first end (23) rotatably supported by the first bearing and a second end (24) rotatably supported by the second bearing; a camshaft (51) rotatably supported in an upper part of the engine main body for actuating an intake valve and an exhaust valve of the engine; a crankshaft pulley (52) fitted on the second end of the crankshaft; a camshaft pulley (53) fitted on the camshaft; and a timing belt (54) passed around the crankshaft pulley and the camshaft pulley; wherein the crankshaft is provided with a reduced diameter portion (24b) having a smaller outer diameter than an adjoining part of the crankshaft on a side of the second bearing facing away from a cylinder (15) defined in the engine main body, and the crankshaft pulley is mounted on the reduced diameter portion.

The reduced diameter portion is required only to bear the load required for driving the timing belt, and, hence, can be significantly reduced in diameter as compared to the adjoining part of the crankshaft. Therefore, the diameter of the crankshaft pulley can be reduced, and the diameter of the camshaft pulley can be reduced in a corresponding manner. Therefore, the overall size, in particular the height of the engine can be minimized, and the mass of the crankshaft pulley and the camshaft pulley can be minimized. Also, the positioning of the crankshaft pulley on the outer side of the second bearing facilitates the assembling and servicing of the engine.

According to a preferred embodiment of the present invention, the engine main body includes a cylinder block (13) defining the cylinder (15) therein and a crankcase (12) attached to a lower end of the cylinder block to define a crankcase chamber (32) jointly with the cylinder block, and wherein the first bearing is supported by the cylinder block, and the second bearing is supported by a bearing retaining member (60) attached to the cylinder block inside the crankcase chamber.

According to this arrangement, the crankshaft pulley is in a highly accessible position so that the assembling and servicing process for the engine can be particularly simplified. If the crankcase is attached to the lower end of the cylinder block at a parting plane (31) that extends obliquely across the crankshaft, the accessibility of the crankshaft pulley and the second bearing can be particularly enhanced.

Typically, for the simplification of the structure of the engine main body, the first bearing is fitted in a hole (34) formed in the cylinder block. The bearing retaining member may consist of an integrally formed member, and a central bore (61) may be formed in the bearing retaining member for receiving the second bearing therein.

According to a particularly preferred embodiment of the present invention, the engine main body includes a belt cover (17) extending from the engine main body such that an air space (Sp1) communicating with outside is defined between an upper part of the cylinder block and the belt cover. This arrangement is made possible by the favorable positioning of the crankshaft pulley, and the air space is beneficial in properly cooling the cylinder block, and hence the engine. If desired, the belt cover may be integrally formed with the cylinder block, typically by metal casting. Also, a cylinder head (14) may be integrally formed with the cylinder block for the simplification of the assembling process.

Typically, the engine consists of a single cylinder engine, and the first end of the crankshaft is an output end of the crankshaft.

According to a particularly preferred embodiment of the present invention, the engine consists of an air cooled engine, and a plurality of fins (16) are formed on an outer peripheral surface of the engine main body, and wherein the engine main body includes a belt cover (17) that defines a power transmission chamber (55) for receiving the timing belt therein, the belt cover including a wall (17a) separating the fins from the timing belt so that an air space (Sp1) communicating with outside is created between the fins and the wall of the belt cover.

Thus, the cylinder block can be favorably cooled by conducting cooling air into the air space between the fins and the wall of the belt cover, and along the cooling fins of the cylinder block.

BRIEF DESCRIPTION OF THE DRAWING(S)

DESCRIPTION OF THE PREFERRED EMBODIMENT(S) A preferred embodiment of the present invention is described in the following with reference to FIGS. 1 to 6.

Figure 1:
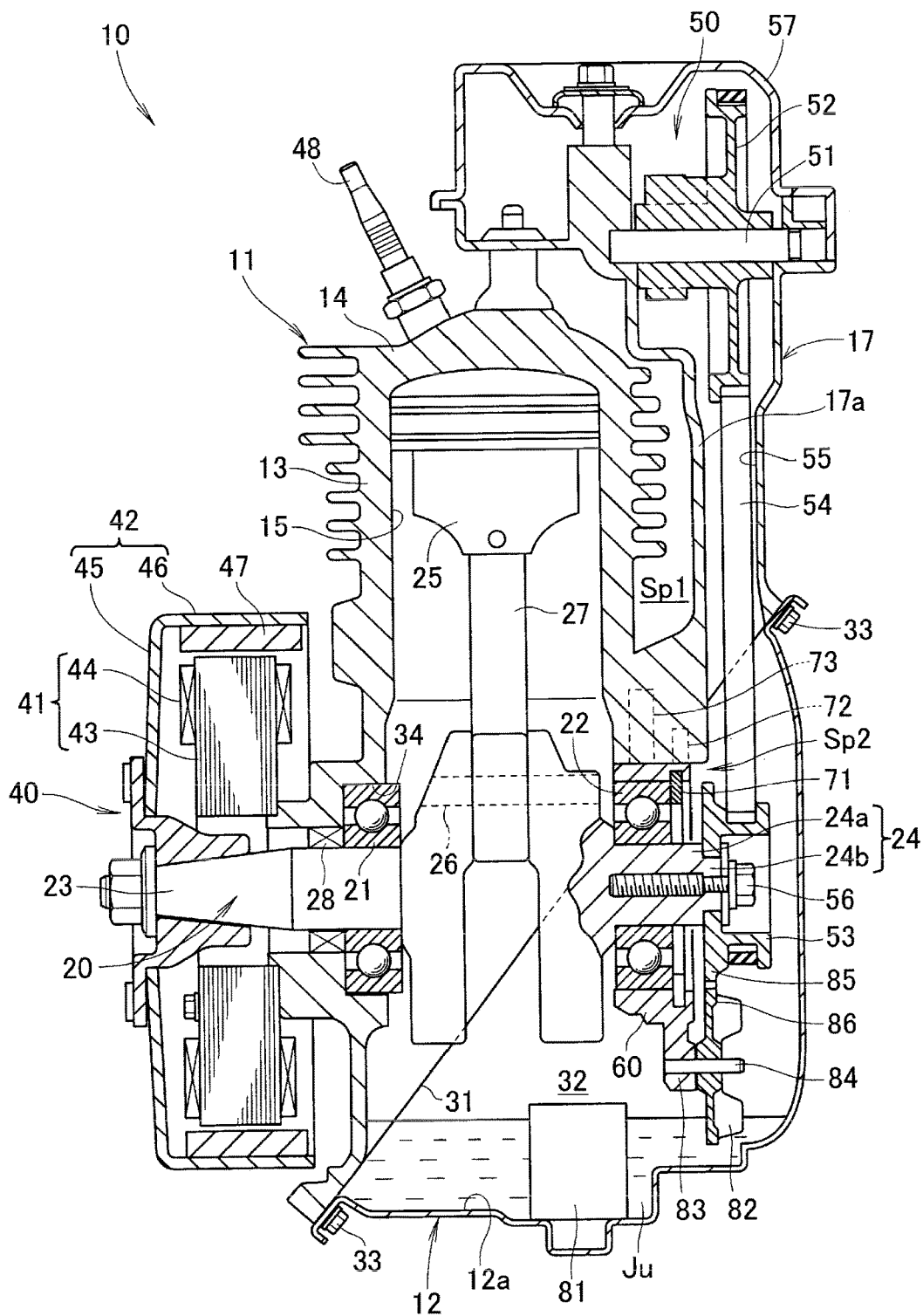
FIG. 1 is a vertical cross sectional view of an overhead camshaft engine given as a first embodiment of the present invention.

Referring to FIG. 1, the engine 10 of the illustrated embodiment includes a cylinder block 11 which integrally combines a cylinder head part 14 and a cylinder block part 13 which are formed as separate component parts in a more conventional arrangement, and internally defines a cylinder 15 therein. This engine 10 consists of a single cylinder, air cooled engine, and is provided with air cooling fins 16 on an outer periphery of the cylinder block part 13.

The cylinder block 11 further includes a belt cover part 17 extending sideways (rightward in FIG. 1) and upward in the shape of letter L when seen from sideways, and internally defines a belt chamber 55. The upper end of the belt chamber 55 is closed by a head cover 57 attached to an upper end of the belt cover part 17 to define a cam actuating mechanism chamber 50. A camshaft pulley 52 is rotatably supported in the cam actuating mechanism chamber 50 by a camshaft 51 which is provided with cams (not shown in the drawings) for actuating an intake valve and an exhaust valve (not shown in the drawings) of the engine 10 in a per se known manner.

As shown in FIG. 1, the belt cover part 17 includes a wall 17a that separates the belt chamber 55 from the finned outer peripheral part of the cylinder block 11 so that an air gap Sp1 communicating with outside is created between the cylinder block 11 and the belt cover part 17. The cylinder block 11, including the cylinder block part 13, the cylinder head part 14 and the belt cover part 17, is typically made by casting iron, aluminum alloy or any per se known material as a one-piece cast product.

The lower end of the cylinder block 11 is defined by an oblique plane 31, and a crankcase 12 is attached to the lower end of the cylinder block 11 at this oblique plane 31 by using a plurality of threaded bolts 33. Thus, a crankcase chamber 32 is defined jointly by the crankcase 12 and the cylinder block 11. The crankcase 12 may be made of stamp formed sheet metal or made of a cast member of suitable material. In the illustrated embodiment, the crankcase 12 is only required to define the crankcase chamber 32 jointly with the cylinder block 11, and is not required to support a loading from any of the moving parts of the engine 10. Therefore, the crankcase 12 may be made of highly light and/or economical material. The bottom part of the crankcase chamber 32 form an oil reservoir 12a for storing a prescribed amount of lubricating oil Ju, and an oil level sensor 81 provided in a low point of the oil reservoir 12a for measuring the level of the lubricating oil Ju therein. The side of the cylinder block 11 that is vertically longer is provided with a bearing hole 34, and a first bearing 21 consisting of a ball bearing is fitted into this bearing hole 34.

The side of the cylinder block 11 that is vertically shorter is provided with a substantially horizontal mounting surface 35 facing downward is a part of the cylinder block 11 adjoining the junction between the cylinder block part 13 and the belt cover part 17. A bearing retaining member 60 defining a central bore 61 for receiving a second bearing 22 also consisting of a ball bearing is attached to this mounting surface 35 by using a pair of threaded bolts 73 and a pair of locating pins 72 or dowel pins which are passed upwards through holes 64 and 65 formed in the bearing retaining member 60 into corresponding holes formed in the cylinder block part 13 past the mating surface defined by the mounting surface 35.

Figure 5:
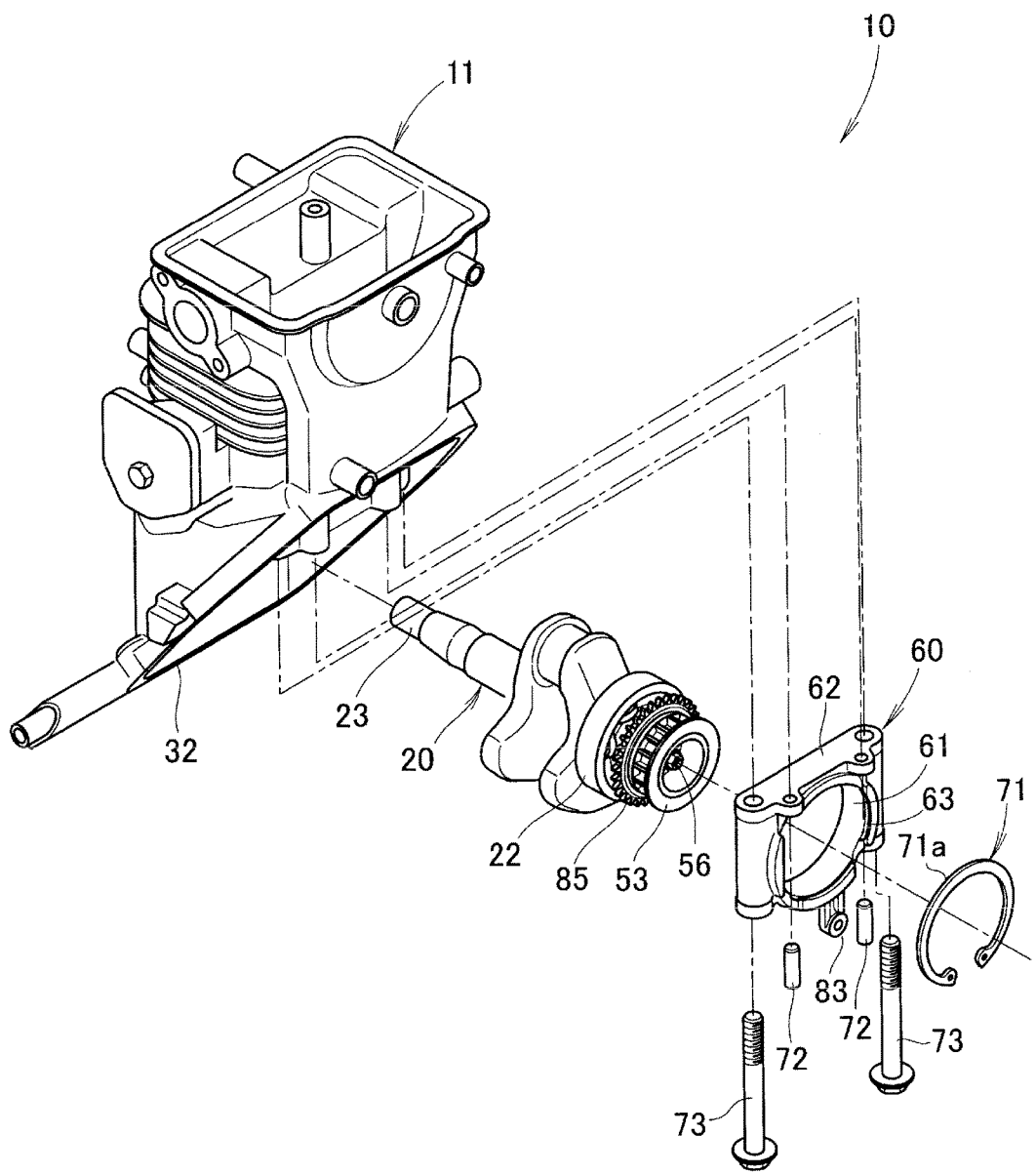
FIG. 5 is an exploded perspective view of the engine.
Figure 6:
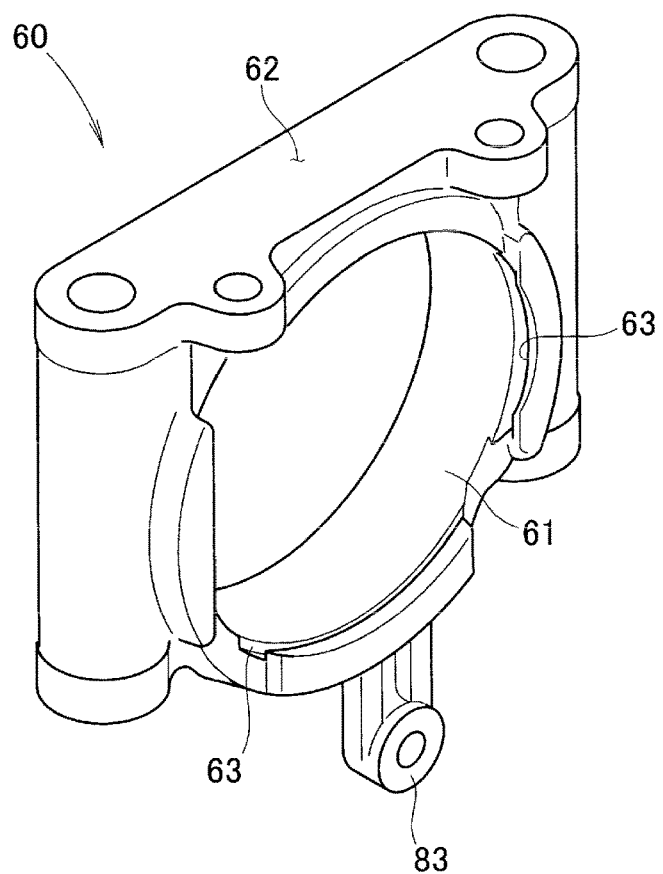
FIG. 6 is a perspective view of the bearing retaining member.

As shown in FIGS. 5 and 6, the bearing retaining member 60 has a rectangular configuration, and has a relatively small fore and aft dimension (the axial dimension of the crankshaft 20). The bearing retaining member 60 has an upper end surface 62 which is planar, and abuts the mounting surface 35. The threaded bolts 73 are passed through the holes 64 extending over the entire vertical length of the bearing retaining member 60 on either side of the central bore 61, and threaded into the corresponding threaded holes formed in the mounting surface 35. The upper part of the bearing retaining member 60 is provided with a pair of flanges 66 having a relatively small (vertical) thickness and projecting outward in the axial direction, and the holes 65 for the locating pins 72 are passed through these flanges 66.

The central bore 61 of the bearing retaining member 60 fitted with the second bearing 22 is coaxial with the bearing hole 34 of the cylinder block 11 fitted with the first bearing 21. A crankshaft 20 is received in the crankcase chamber 32, and has a first end 23 rotatably supported by the first bearing 21 and a second end 24 rotatably supported by the second bearing 22. The crankshaft 20 is provided with a crankpin 26, and a piston 25 slidably received in the cylinder 15 is connected to the crankpin 26 via a connecting rod 27 in a per se known manner. In the illustrated embodiment, the inner race of each of the bearings 21 and 22 abuts a corresponding annular shoulder surface defined in the crankshaft 20.

The first bearing 21 is provided with an oil seal 28 for preventing leakage of engine lubricating oil from the crankcase chamber 32. The outer race of the first bearing 21 abuts an inwardly facing annular shoulder surface defined in the bearing hole 34 of the cylinder block 11, and the inner race of the first bearing 21 abuts an outwardly facing annular shoulder surface defined in the crankshaft 20 so that the first bearing 21 is prevented from moving axially.

The first end 23 of the crankshaft 20 projects outward from the first bearing 21, and is fitted with a cup shaped outer rotor 42 including a coaxial central disk 45 and an axial flange 46 extending axially inward from the peripheral edge of the central disk 45. A plurality of permanent magnets 47 are fixedly attached to the inner circumferential surface of the axial flange 46 of the outer rotor 42 at a regular angular interval. An inner stator 41 is fixedly secured to the outer face of the cylinder block 11, and includes a core 43 fixedly attached to the outer side of the outer wall of the cylinder block 11 in a coaxial relationship to the crankshaft 20, and a plurality of windings 44 formed on the stator core 43 in such a manner that electric current is generated in the windings 44 as the outer rotor 42 is rotated relative to the stator core 43. The produced current is conducted from the windings 44, and used for powering an ignition plug 48 of the engine 10 via a per se known ignition circuit not shown in the drawings. The first end 23 of the crankshaft 20 serves as the output end of this engine 10.

The outer side of the rotor 42 is covered by an engine cover (not shown in the drawings) which is attached to the outer side of the engine 10 to define a cooling air passage, and a plurality of cooling fans (not shown in the drawings) is provided on the axial end surface of the central disk 45 to create a cooling air flow that is conducted through the cooling air passage.

Figure 2:
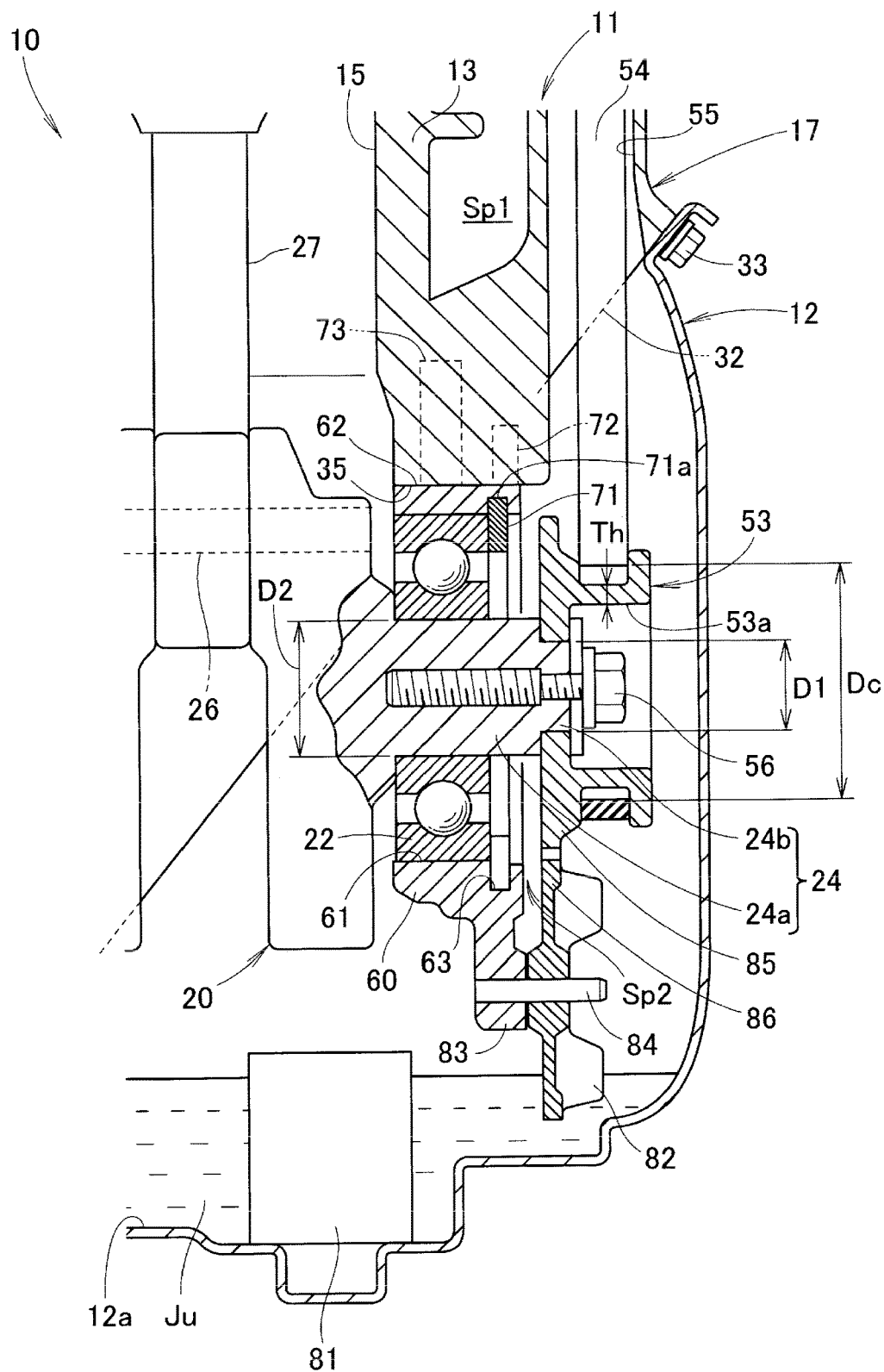
FIG. 2 is an enlarged sectional view showing the bearing retaining member and the crankshaft pulley of the engine.

As best shown in FIG. 2, the second bearing 22 is fixed in position by a circlip 71 which is fitted into an annular radial groove 63 formed in an outer end part of the central bore 61 of the bearing retaining member 60. Thus, the second bearing 22 is held in axial position owing to the annular shoulder surface of the crankshaft 20, and the circlip 71. The second end 24 of the crankshaft 20 includes a journal portion 24a supported by the second bearing 22 and a reduced diameter portion 24b provided on the outer most part of the second end 24. A crankshaft pulley 53 is fitted onto this reduced diameter portion 24b, and fixedly secured in position by a threaded bolt 56 threaded into a threaded hole formed in the axial end of the second end 24 of the crankshaft 20. As can be appreciated by a person skilled in the art, the circlip 71 is only an example, and any other circular or part circular retaining member may be used in place of the circlip 71 without departing from the spirit of the present invention.

Figure 4:
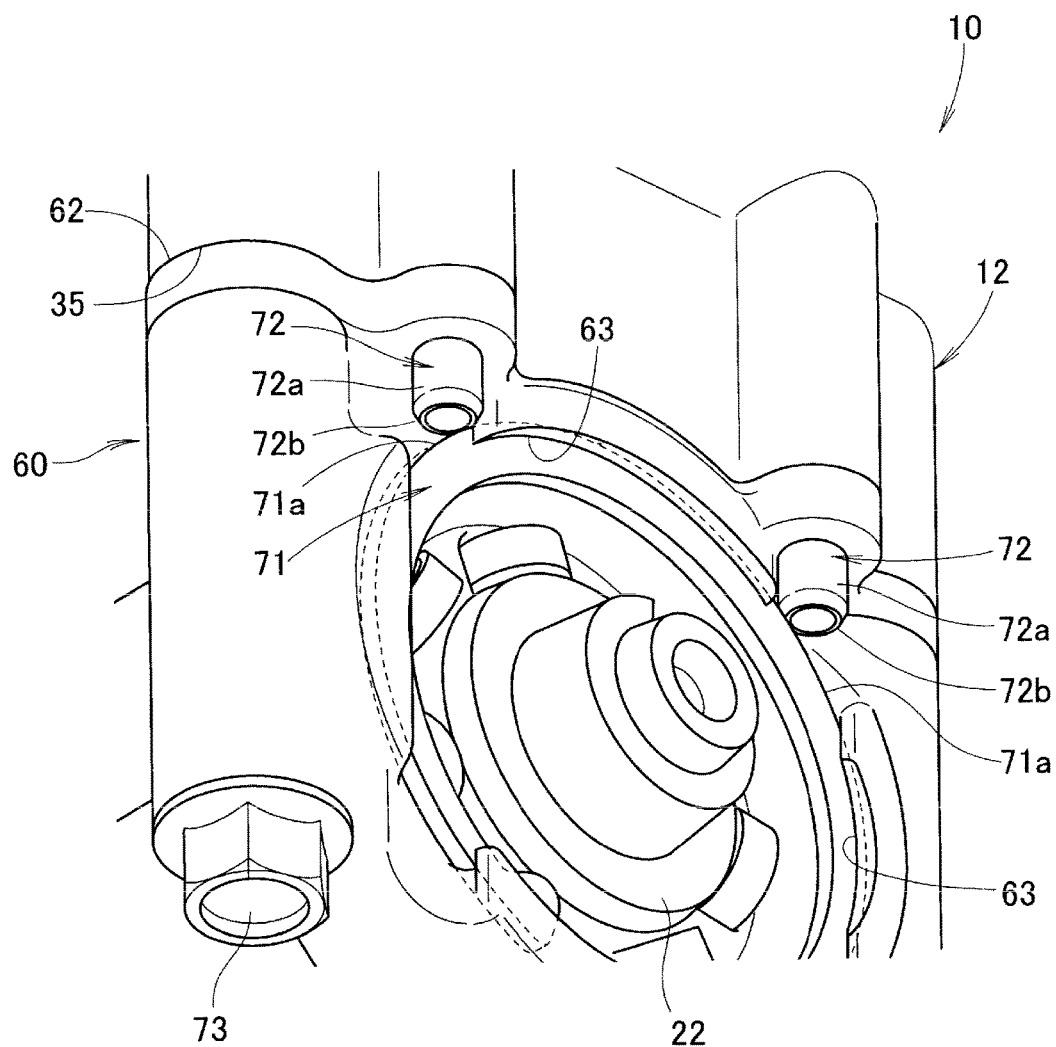
FIG. 4 is a detailed view showing an essential part of the bearing retaining member.

As best illustrated in FIGS. 4 and 6, the radial groove 63 extends only over small angular ranges in side parts and an upper and lower part of the central bore 61. Therefore, the circlip 71 received in the radial groove 63 is exposed in a pair of upper side parts and a pair of lower side parts where the material of the bearing retaining member 50 is removed. In particular, the part of the circlip 71 adjoining each locating pin 72 is exposed, and located such that an exposed part of the circlip 71 is located directly under the lower end 72a of each locating pin 72. Thereby, the downward movement of each locating pin 72 is prevented by the corresponding part of the circlip 71 abutting the end surface 72b of the locating pin 72. Therefore, even though the locating pins 72 are pushed into the corresponding holes in an upward direction, the dislodgement of the locating pins 72 can be prevented without requiring any particular measure or any additional component parts.

Figure 3:
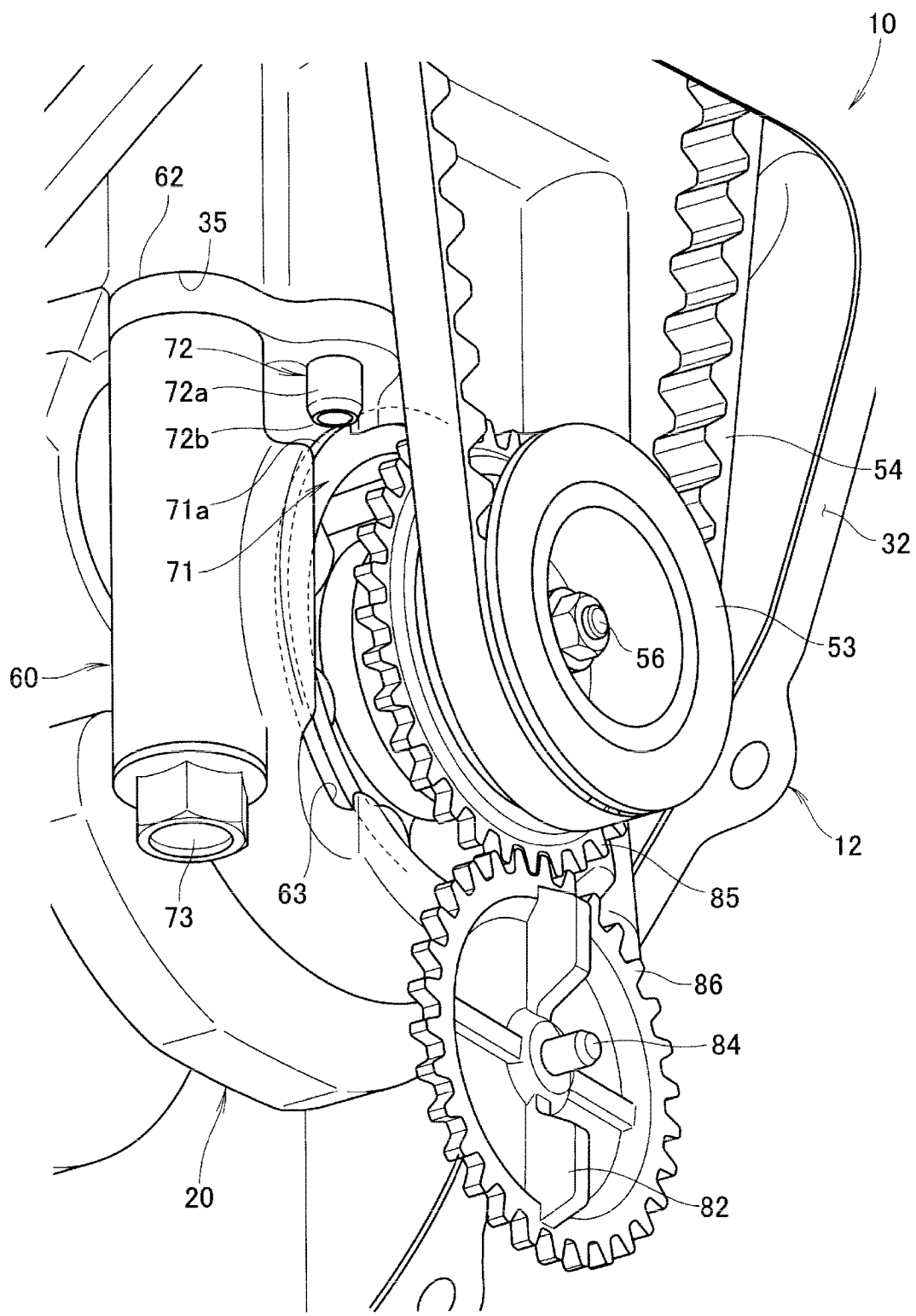
FIG. 3 is an enlarged perspective view showing the bearing retaining member and the crankshaft pulley of the engine by omitting the crankcase from illustration.

Because the lower ends 72a of the locating pins 72 are exposed and visible in the crankcase chamber 32 as shown in FIG. 3, inadvertent omission of the locating pins 72 during the manufacturing or servicing process can be avoided. Also, the part of the bearing retaining member 60 adjoining each locating pin 72 is cut away, the locating pin 72 is positioned in a relatively accessible area so that the insertion and removal of the locating pin 72 can be performed without any difficulty.

As best shown in FIG. 2, while the journal portion 24a (having an outer diameter D2) is fitted into the central bore of the inner race of the second bearing 22, the reduced diameter portion 24b (having an outer diameter D1 which is smaller than the outer diameter D1 of the journal portion 24a) is fitted into the central bore of the crankshaft pulley 53. Therefore, the outer diameter Dc of the crankshaft pulley 53 can be reduced as compared to the case where no reduced diameter portion is provided, and the part having the same outer diameter as the journal portion 24a is fitted into the central bore of the crankshaft pulley 53, for the given thickness Th of the hub 53a of the crankshaft pulley 53. The diameter of the camshaft pulley 52 is required to have a prescribed relationship to the diameter of the crankshaft pulley 53 in order to synchronize the operation of the engine valves in relation to the angular position of the crankshaft 20. Therefore, when the diameter of the crankshaft pulley 53 is reduced, the diameter of the camshaft pulley 52 can be reduced by the same factor. Therefore, the reduction in the diameter of the crankshaft pulley 53 is beneficial in reducing the overall height of the engine 10, and hence reducing the weight of the engine 10.

A timing belt 54 is passed around the crankshaft pulley 53 and the camshaft pulley 52 so that the rotational movement of the crankshaft 20 may be transmitted to the camshaft 51 at twice the speed of the crankshaft 20 in a synchronized relationship required for the four-stroke engine in a per se known manner. In the illustrated embodiment, the timing belt 54 consists of a cogged belt made of plastic material, but may also consist of other types of belts, or may consist of a chain. In the latter case, the camshaft pulley 52 and the crankshaft pulley 53 would consist of sprocket wheels. In the illustrated embodiment, the crankshaft pulley 53 is positioned on the outer side of the second bearing 22 or on the other side of the cylinder 15 with respect to the second bearing 22 so that the distance between the first bearing 21 and the second bearing 22 can be minimized. In the illustrated embodiment, there is nothing between the first bearing 21 and the second bearing 22 except for the crank webs and the crankpin of the crankshaft 20.

Also, owing to the advantageous positioning of the crankshaft pulley 53 of the illustrated embodiment, the timing belt 54 can be received in the belt cover part 17 which extends from the cylinder block part 13 so that the combustion heat can be transferred from the cylinder 15 to the cooling fins 16 in a favorable manner without being hindered by the presence of the timing belt 54. The cooling air may be guided to the air gap Sp1 between the cylinder block part 13 and the belt cover part 17 of the cylinder block 11 so that the cooling efficiency may be enhanced. Furthermore, according to the illustrated embodiment, the timing belt 54 is favorably protected from the heat of the engine 10 so that the service life of the timing belt 54 can be extended.

As shown in FIGS. 1 to 3, an oil slinger member 82 is rotatably supported by a lower extension 83 of the bearing retaining member 60 via a pivot shaft 84 extending in parallel with the axial line of the crankshaft 20, and is provided with a first gear 86 formed along an outer periphery of the oil slinger member 82. The crankshaft pulley 53 is provided with a second gear 85 along an outer periphery thereof, and the first gear 86 and the second gear 85 mesh with each other so that the oil slinger member 82 is rotated when the engine 10 is in operation.

In the illustrated embodiment, the second gear 85 is formed on the outer periphery of the crankshaft pulley 53 so that the axial length of the engine 10 may be minimized, but may also be formed as a separate gear member coaxially fitted on the second end 24 of the crankshaft 20 owing to the ample space Sp2 available on the outer side of the second bearing 22.

Figure 7:
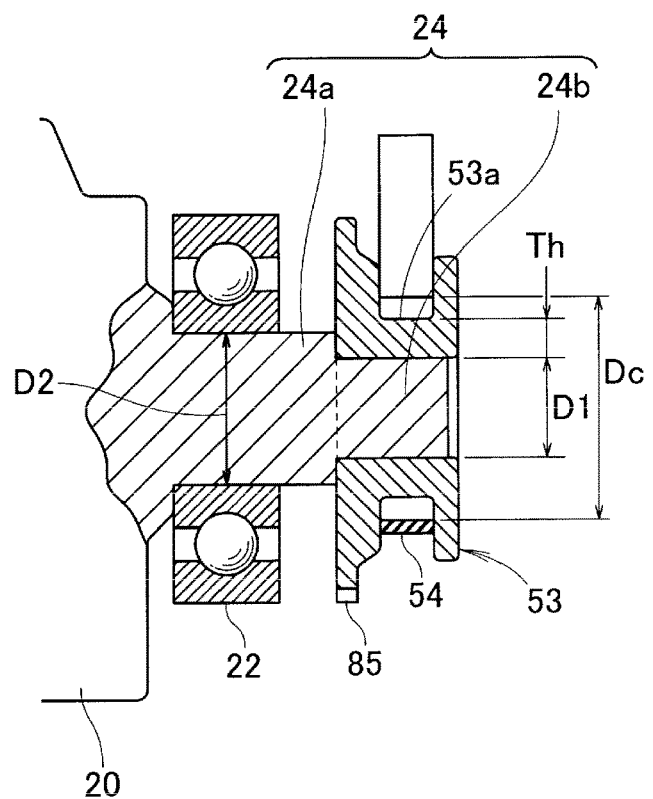
FIG. 7 is a sectional view of the crankshaft pulley fitted on the second end of the crankshaft in a second embodiment of the present invention.

FIG. 7 shows a second embodiment of the present invention. This embodiment differs from the first embodiment in the way the crankshaft pulley 53 is fitted on the second end 24 of the crankshaft 20. In this embodiment, the crankshaft pulley 53 is press fitted onto the reduced diameter portion 24b of the second end 24 of the crankshaft 20. This fit is a tight fit so that the crankshaft pulley 53 is held rotationally fast to the crankshaft 20.

This engine is particularly suitable for use as general purpose engines for powering various types of equipment, not exclusively, such as lawn mowers, power generators and snow blowers.

Although the present invention has been described in terms of preferred embodiments thereof, it is obvious to a person skilled in the art that various alterations and modifications are possible without departing from the scope of the present invention.

The invention claimed is:

1. An overhead camshaft engine, comprising:
    a first bearing and a second bearing provided on an engine main body;
    a crankshaft having a first end rotatably supported by the first bearing and a second end rotatably supported by the second bearing;
    a camshaft rotatably supported in an upper part of the engine main body for actuating an intake valve and an exhaust valve of the engine;
    a crankshaft pulley fitted on the second end of the crankshaft;
    a camshaft pulley fitted on the camshaft; and
    a timing belt passed around the crankshaft pulley and the camshaft pulley;
    wherein the crankshaft is provided with a reduced diameter portion having a smaller outer diameter than an adjoining part of the crankshaft on a side of the second bearing facing away from a cylinder defined in the engine main body, and the crankshaft pulley is mounted on the reduced diameter portion,
    wherein the engine main body includes a cylinder block defining the cylinder therein and a crankcase attached to a lower end of the cylinder block to define a crankcase chamber jointly with the cylinder block,
    wherein the first bearing is supported by the cylinder block, and
    wherein the engine further comprises a bearing retaining member attached to the cylinder block inside the crankcase chamber and supporting the second bearing.

2. The overhead camshaft engine according to claim 1, wherein the crankcase is attached to the lower end of the cylinder block at a parting plane that extends obliquely across the crankshaft.

3. The overhead camshaft engine according to claim 1, wherein the first bearing is fitted in a hole formed in the cylinder block.

4. The overhead camshaft engine according to claim 1, wherein the bearing retaining member consists of an integrally formed member, and a central bore is formed in the bearing retaining member for receiving the second bearing therein.

5. The overhead camshaft engine according to claim 1, wherein the engine main body includes a belt cover extending from the engine main body such that an air space communicating with outside is defined between an upper part of the cylinder block and the belt cover.

6. The overhead camshaft engine according to claim 5, wherein the belt cover is integrally formed with the cylinder block.

7. The overhead camshaft engine according to claim 1, wherein a cylinder head is integrally formed with the cylinder block.

8. The overhead camshaft engine according to claim 1, wherein the engine consists of a single cylinder engine.

9. The overhead camshaft engine according to claim 1, wherein the first end of the crankshaft is an output end of the crankshaft.

10. The overhead camshaft engine according to claim 1, wherein the engine consists of an air cooled engine, and a plurality of fins are formed on an outer peripheral surface of the engine main body, and wherein the engine main body includes a belt cover that defines a power transmission chamber for receiving the timing belt therein, the belt cover including a wall separating the fins from the timing belt so that an air space communicating with outside is created between the fins and the wall of the belt cover.

* * * * *